United States Patent [19]

Kiremidjian et al.

[11] Patent Number: 4,704,697

[45] Date of Patent: Nov. 3, 1987

[54] MULTIPLE STATION VIDEO MEMORY

[75] Inventors: Frederick B. Kiremidjian, Dublin; Jefferson C. Buchanan, San Jose, both of Calif.

[73] Assignee: Counterpoint Computers, San Jose, Calif.

[21] Appl. No.: 745,621

[22] Filed: Jun. 17, 1985

[51] Int. Cl.[4] .......................... G06K 3/00; G06F 15/40
[52] U.S. Cl. ..................... 364/518; 340/747; 340/798; 364/521
[58] Field of Search ............... 364/518, 520, 521, 522, 364/523; 340/750, 720, 730, 731, 727, 747, 703, 798–800, 717; 358/21 R

[56] References Cited

U.S. PATENT DOCUMENTS

| 4,119,953 | 10/1978 | Yeschick | 340/717 |
|---|---|---|---|
| 4,500,875 | 2/1985 | Schmitz | 340/723 X |
| 4,509,043 | 4/1985 | Mossaides | 340/747 X |
| 4,520,358 | 5/1985 | Makino | 340/747 X |
| 4,580,242 | 4/1986 | Suzuki et al. | 340/799 X |
| 4,591,997 | 5/1986 | Grabel | 364/518 X |
| 4,622,547 | 11/1986 | Furukawa et al. | 340/750 |

Primary Examiner—Felix D. Gruber
Assistant Examiner—H. R. Herndon
Attorney, Agent, or Firm—Flehr, Hohbach, Test, Albritton & Herbert

[57] ABSTRACT

There is described a memory system for use in a data processing system having more than one bit mapped display station. The memory system uses a single memory array for storing at least one separate full screen of bit mapped video data for each display station. A single video controller controls the process by which video data is read from the memory array and then simultaneously transmitted to each of the display stations. Furthermore, a memory access control unit coordinates use of the memory by the video controller and the data processing unit and also translates address signals generated by the data processing unit so that it can access the video data for each display station using a contiguous set of address values.

7 Claims, 11 Drawing Figures

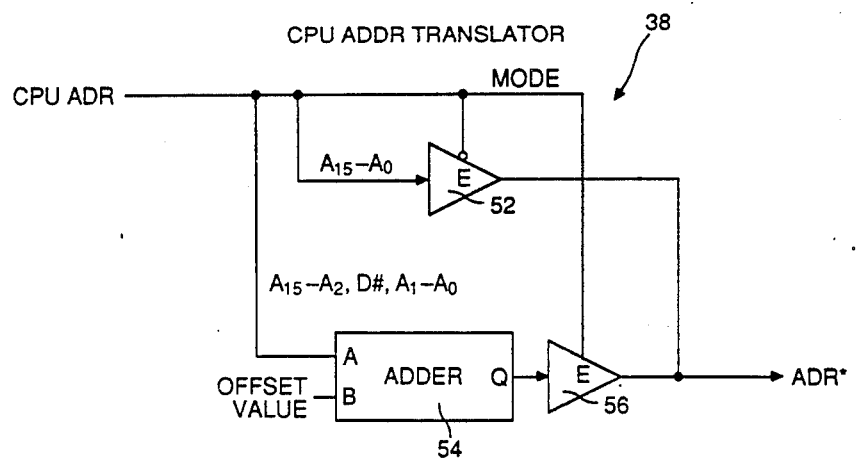
FIGURE 4
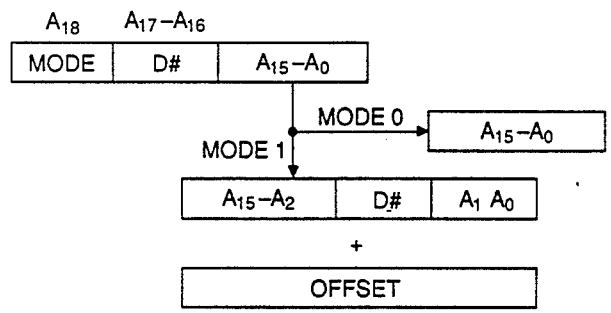
FIGURE 4B
FIGURE 4A

MULTIPLE STATION VIDEO MEMORY

The present invention relates generally to an improved video memory and particularly to a video memory which can serve as the frame buffer for several display stations.

BACKGROUND OF THE INVENTION

The prior art includes a number of video memory systems, using a variety of memory organization schemes. The present invention is directed at multiple station computer systems which use bit mapped displays.

For those not skilled in the art, a "bit mapped" video display system is a display system in which the picture for a display is stored in a memory array, with a separate bit (or set of bits) of memory being used to store the picture for each position on the system's display. Every position on the display is called a pixel, and a typical display has 400 horizontal lines of 640 pixels.

A basic monochrome (i.e., black and white) display system generally needs only one bit of memory for each pixel because the pixel is either on or off. Many so-called monochrome displays have three levels of illumination for each pixel: dark, on, and bright. Such systems require two bits of memory per pixel. Other monochrome display systems have additional levels of shading, requiring additional bits of memory for the storage of each pixel, and are sometimes called gray scale display systems. For the purposes of this discussion, the term "monochrome display" is defined to include all of these types of non-color display systems.

A color display system typically needs at least four bits of memory for each pixel so that at least sixteen different colors can be used. Clearly, the more colors used the greater the number of bits needed per pixel. Another aspect of most color display systems is that a "color map" is used to define what color corresponds to each binary pixel value stored in memory. This color map is generally a high speed memory array which translates the video data for each pixel into the signals needed by the system's video signal generator.

In the prior art bit mapped video display systems known to the inventors, each display either has its own frame buffer or shares a memory array with a data processing unit. The present invention differs from these prior art systems in that a single memory buffer is used to hold the video data for a plurality of displays. In the preferred embodiment, a preselected portion of this memory buffer is allocated for general memory usage by the system's data processing unit, and the rest of the buffer is used for storing video data.

In some prior art memory systems, the portion of the system's memory array which is used as a frame buffer can either be a predefined portion of the array or can be dynamically allocated. In fact, a large amount of effort has been devoted to the design of dynamic memory allocations systems. Dynamic allocation systems are useful for a number of functions including scrolling of the screen and allowing switching between two or more screens of data without having to pause while the video memory is rewritten. The present invention, however, is directed at a different type of improvement, specifically an improved memory system for multiple video displays.

One shortcoming of the aforementioned prior art is that in multiple station computer systems, the memory control hardware is repeated for each station. Since video memory systems have fairly stringent timing constraints and require dual porting to allow access by both a data processing unit and a video controller, significant cost savings can be achieved by avoiding the duplication of memory control hardware.

One major potential problem with the use of a single memory array for multiple display stations is that the required speed of access to the memory array could exceed the speed of operation available on current low cost memory devices. A second potential problem is the difficulty in devising an efficient and convenient memory addressing scheme for use by the data processing portion of the system. These potential problems are overcome by the present invention.

Another aspect of the present invention is that the same memory system can be used either for multiple monochrome display stations, or for a smaller number of color display stations. In accordance with this aspect of the present invention, the memory system has two modes of operation: one mode for multiple monochrome stations and one mode for color displays. This aspect of the present invention can produce significant cost savings by eliminating the need for separate monochrome and color system designs and also eliminating the corresponding duplication in inventory and quality control expenses.

It is therefore a primary object of the present invention to provide an improved video memory system for computer systems having a plurality of display stations.

SUMMARY OF THE INVENTION

In summary, the present invention is a memory system for use in a data processing system having a data processing unit and at least two bit mapped display stations. The memory system uses a single memory array for storing at least one separate screen of bit mapped video data for each display station. A single video controller controls the process by which video data is read from the memory array and then simultaneously transmitted to each of the display stations.

The memory system is organized so that the video data for the displays is interleaved. For display purposes, the video data is read simply by sequential memory access and the video controller routes each parcel of video data to the appropriate display. Furthermore, a memory access control unit coordinates use of the memory by the video controller and the data processing unit. The memory access control unit also translates address signals generated by the data processing unit so that it can access the video data for each display station using a contiguous set of address values, even though the video data is actually stored in memory using an interleaved pattern.

In a preferred embodiment of the invention the same memory system can be used either for multiple monochrome display stations, or for a smaller number of color display stations.

BRIEF DESCRIPTION OF THE DRAWINGS

Additional objects and features of the invention will be more readily apparent from the following detailed description and appended claims when taken in conjunction with the drawings, in which:

FIG. 4 is a block diagram of a CPU address translator which is used in a preferred embodiment of the invention. FIGS. 4A and 4B depict the address translation performed by the translator shown in FIG. 4.

DESCRIPTION OF THE PREFERRED EMBODIMENT

Figure 1:
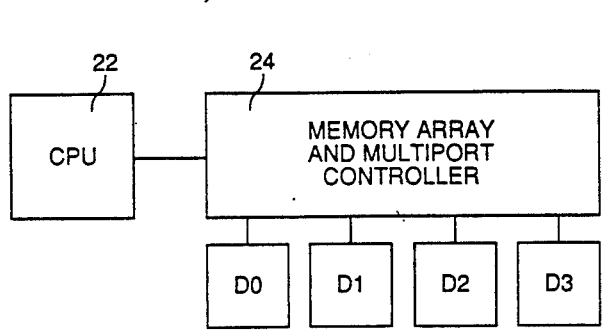
FIG. 1 is a block diagram of a computer system incorporating the present invention.

Referring to FIG. 1, there is shown a computer system 20 including a data processing system (CPU) 22, a memory system 24, and a plurality of display stations D0 to D3. The present invention is an improved memory system 24.

For the purposes of this description, the display stations D0–D3 are standard bit mapped, raster scan, monochrome video displays. The resolution of each display station is 640 by 400 pixels.

As will be explained in more detail below, the memory system 24 includes a large, dynamic CMOS memory array with enough memory for both general data processing purposes and for storing at least one separate screen of video data for each display station D0–D3. The memory system 24 also includes the control circuitry for permitting the CPU 22 to access the memory array, for automatically sending video data from the memory array to the displays, and for automatically refreshing the memory.

Figure 2A:
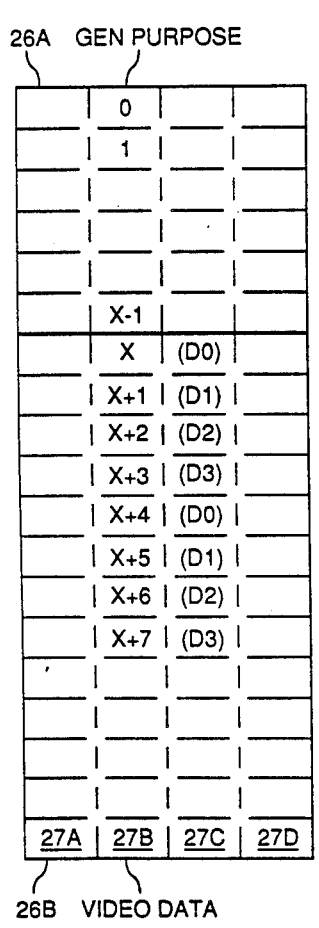
FIG. 2A is a schematic memory map of a video memory system in accordance with the invention.

Referring to FIG. 2A, there is shown a memory map for the memory array 26 used in the preferred embodiment. This map is an memory address map in which memory addresses increase from top to bottom.

As shown, the memory array 26 can be considered to organized as a set of four columns 27A to 27D. For the purposes of FIG. 2A only, each row of the memory map is given a single address. In the preferred embodiment, however, each row comprises four bytes of data, each of which is individually addressable. For convenience, each set of four bytes of data is also called one word of data.

The upper portion 26A of the memory array 26 (e.g., from memory address 0 to memory address X−1) is used for general data processing purposes. The lower portion 26B of the memory array 26 (i.e., having memory addresses starting with X) is used for storing video data.

The video data for each display D0–D3 is stored in a distinct set of rows. The video display corresponding to data in each row is shown in parentheses after the address of the row. As shown, the video data for the four displays are interleaved, with the video data for each display stored at every fourth memory (word) location. Thus if a word of video data for display D1 is stored at memory location L, then the next word (i.e., set of four bytes) of video data for that display will be stored at memory location L+4.

Figure 2B:
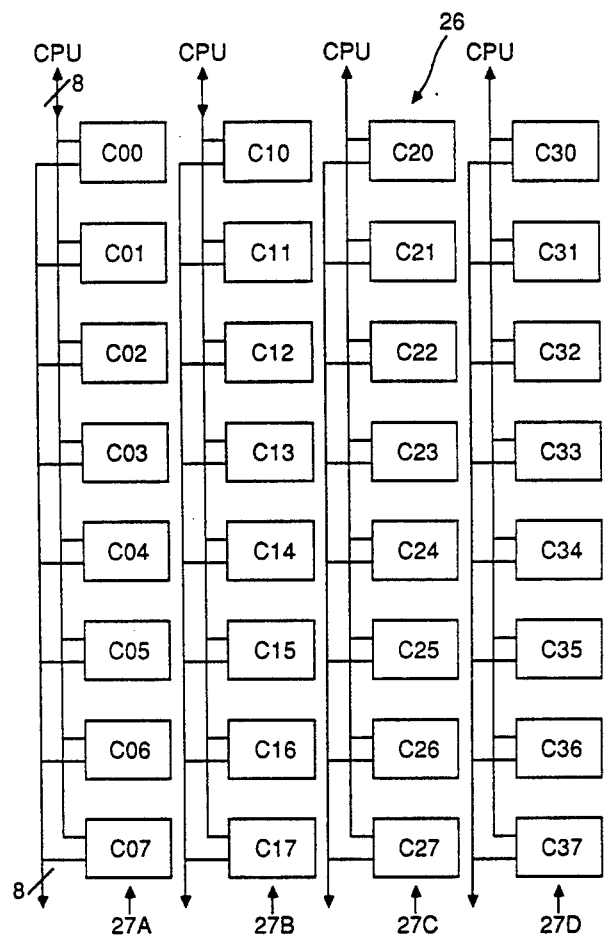
FIG. 2B is a schematic drawing of the physical organization of the memory chips used in a memory system incorporating the present invention.

Referring to FIG. 2B, in the preferred embodiment the memory array 26 comprises four columns 27A–27D of 64k CMOS RAM chips C00–C37, each column having eight RAM chips Cx0–Cx7. Thus the memory array 26 holds 2,097,152 (2M) bits. Since the memory array 26 is accessed by the CPU 22 one byte (i.e., eight bits) at a time, all eight chips Cx0–Cx7 in each column are accessed simultaneously, each chip providing one bit of the byte being accessed.

The preferred embodiment uses a particular memory chip, the TMS 4161 made by Texas Instruments, but the invention is applicable to memory systems 24 using virtually any type of random access memory device with sufficiently fast access to allow its use in a video system. The TMS 4161 memory device is used because it includes two features: first, it is dual ported: a CPU port is used for CPU data access and a video port is used by a video processor; and second, the video port is connected to an internal 256 bit shift register which allows fast and convenient access to a sequential set of 256 bits. The product specification published by Texas Instruments for the TMS 4161 is hereby incorporated by reference.

As will be explained in greater detail below, the data lines from the CPU ports are connected to the CPU 22 and the data lines from the video ports are connected to video buffers for the displays D0–D3.

Figure 3:
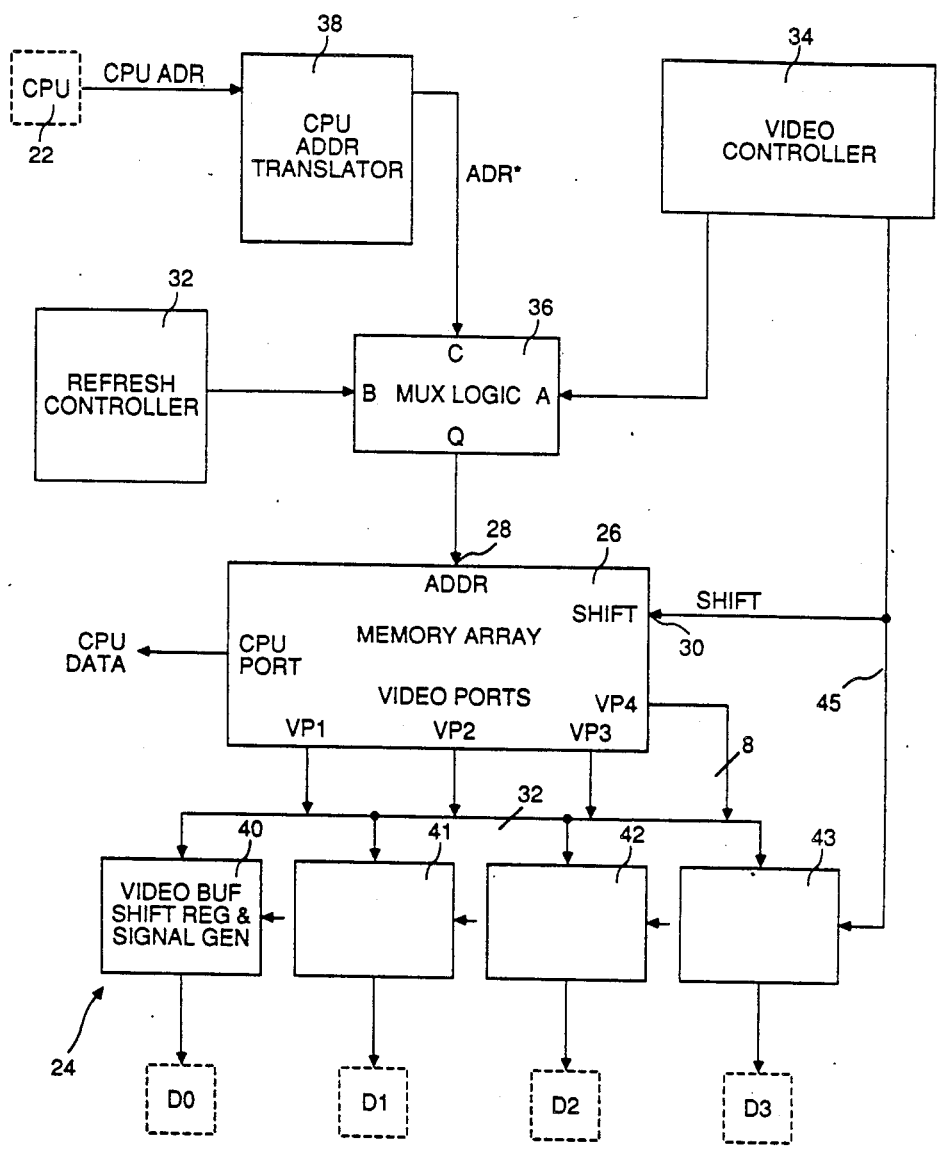
FIG. 3 is a block diagram of a video memory system in accordance with the invention.

Referring to FIG. 3, there is shown a block diagram of the preferred embodiment of the memory system 24. The memory array 26 has an address port 28, a CPU port, four video ports VP1–VP4, and a shift clock port. The ports for read/write signals, and other clock and control signals are not shown because their use is conventional.

There are three subsystems which need to address the memory 26: the CPU 22, a memory refresh controller 32, and a video controller 34. In general, when memory access requests from more than one subsystem overlap access is allocated in accordance with a priority scheme. The video controller 34 has highest priority because the flow of data to the displays D0–D3 must be synchronized with the raster scan timing of the displays D0–D3. Next, the refresh controller 32 has second priority because failure to refresh the dynamic memory in the array within predefined time constraints can cause the loss of data. Finally, the CPU 22 has lowest priority.

An address multiplexer logic subassembly 36 carries out the above described prioritized memory access scheme. The multiplexer 36 also provides several modes of memory access. In particular, when the CPU 22 is accessing the memory array 26 only one column of the memory array 26 is addressed. During refresh cycles and video display cycles, all four memory columns 27A–27D are accessed simultaneously.

The memory refresh controller 32 is of conventional design. It generates memory access requests sufficiently often to exercise all the rows of the memory chips in the memory array 26 at least once during each predefined refresh period (typically four milliseconds). During refresh periods every memory chip in the array 26 is simultaneously exercised. Since the TMS 4161 chips are internally organized as a 256 by 256 bit array, only 256 refresh cycles are needed during each refresh period.

The video controller 34 is also of generally conventional design in that it generates (1) the standard horizontal and vertical synchronization signals (H-sync and V-sync) needed for controlling the displays, (2) the memory address signals needed to access the video data, and (3) and the sequence control signals needed to serially transmit the video data to the displays. On the other hand, the video controller is specially adapted for use with the TMS 4161 memory chip and it is also specially adapted for use with the memory mapping scheme described above.

The video controller 34 generates a memory address only once for each set of 256 video data access cycles, because the memory chips Cxx in the memory 26 have an internal 256 bit shift register. On all the other video data cycles the only memory access signal generated by the video controller 34 is a SHIFT clock signal, which causes the internal shift registers in the memory chips Cxx to each shift out the next video data bit needed.

The video controller 34 also generates control signals for the video buffers 40–43 which receive the video data from the memory array 26 and then transmit it to the displays D0–D3. In the preferred embodiment, the video buffers 40–43 are double-buffered "pixel spitters", the design of which is described in more detail with reference to FIGS. 5 and 6. The design of the video controller 34 is described in more detail with reference to FIG. 8.

As is well known to those skilled in the art, the control signals needed to control video buffers 40–43 are: (1) a clock signal for loading data received from the memory array 26; (2) a pixel clock for controlling the rate at which data is transmitted to the display stations D0–D3; and (3) horizontal and vertical synchronization signals for synchronizing the transmission of data to the display stations D0–D3 with the raster scan action of the displays. In FIG. 3, these control signals are carried by line 45.

During CPU memory access cycles a CPU address translator 38 filters the address signals generated by the CPU 22. The translator 38 has two modes of operation: one (mode 0) for accessing the general purpose subarray 26A and another (mode 1) for accessing the video subarray 26B (see Figure 2A). When the CPU 22 addresses the general purpose subarray 26A the address generated by the CPU 22 is used (i.e., unchanged) to address the memory array 26. However, when the CPU 22 addresses the video subarray 26B, the address generated by the CPU 22 is translated so that the CPU can use a contiguous set of address values to address the video data for each display.

Referring to FIG. 4, the CPU address translator 38 comprises one buffer 52 which is enabled when an address mode (labelled Mode in the figure) signal is low, and an adder 54 and buffer 56 which are enabled when the mode signal is high. As shown in FIG. 4A, the address mode (0 for general purpose, 1 for video data) is specified by bit A18 of the CPU address signal. When in address mode 1, bits A17–A16 of the CPU address signal specify the display being addressed.

The first buffer 52 acts as conduit which does not affect the value of the CPU address signal when the general purpose portion 26A of the memory array 26 is being accessed (Mode 0). However, when the video data portion 26B of the memory array 26 is being addressed (Mode 1), only the second buffer 56 is enabled, and the output of the adder 54 (which adds a preselected OFFSET value with the binary number which represents the displacement of the byte of video data which is being addressed from the beginning of the video subarray 26B) is used as the address signal for addressing the memory 26. Thus the address translator 38 acts as an offset generation means for translating the contiguous set of address values used by the CPU 22 for accessing the video data for each display station into the physical memory address signals in accordance the data storage pattern described above.

As shown in FIGS. 4A and 4B, mathematically, the memory location M of the byte of video data at CPU address 1,D#,A15–A0 for display D# is $$M = \text{OFFSET} + \text{A15-A2}, D\#, \text{A1}, \text{A0} \qquad (\text{Eq. 1})$$

where OFFSET is equal to the size of the general purpose memory subarray 26A; A15–A0 is the binary address signal generated by the CPU 22 for accessing the memory array 26; D# is equal to 00, 01, 10, or 11, depending on which display station's data is being accessed; and A15–A12,D#,A1,A0 represents the binary displacement of the byte of video data which is being addressed from the beginning of the video subarray 26B.

In accordance with the above described address scheme, it can be seen that a separate set of contiguous address values is used by the CPU 22 to access the video data for each display D0–D3. The size of each set of contiguous address values for accessing the video data for each display is the number of memory locations available for storing video data for each display. In the preferred embodiment, the number of memory locations needed to store the video data for each display is $640 \times 400 / 8$ (bits per byte) = 32,000.

Figure 5:
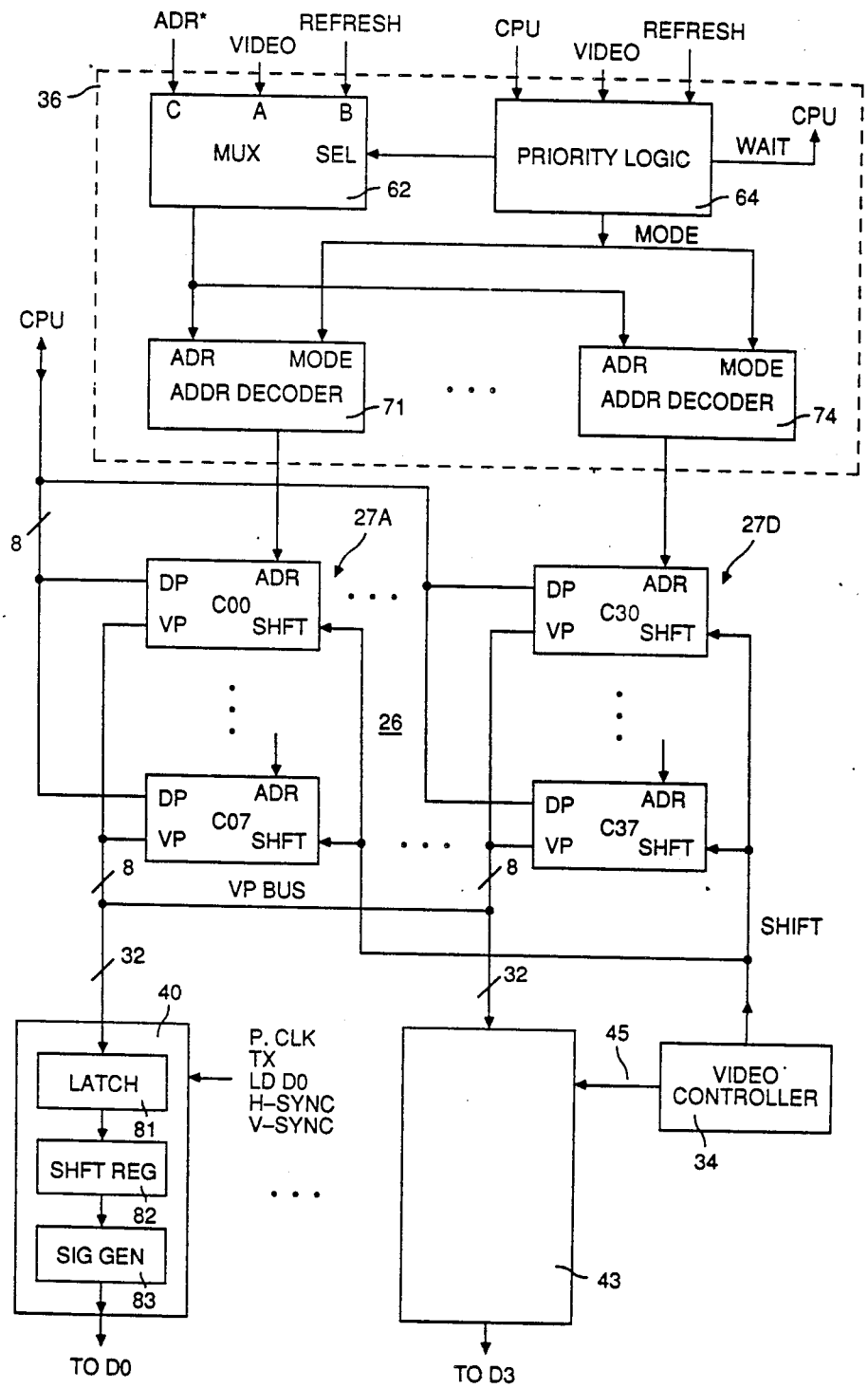
FIG. 5 is a block diagram of the multiplexer address logic, memory array and video buffers used in a preferred embodiment of the invention.

Referring to FIG. 5, there is shown an expanded view of the multiplexer logic 36, memory array 26, and video buffers 40–43 shown in FIG. 3.

The multiplexer logic 36 includes a multiplexer 62, a priority logic circuit 64, and address decoders 71–74 for each column of memory chips. As already described, the priority logic circuit 64 determines which source of address signals is to be used in accordance with a predefined priority scheme. The priority logic circuit 64 generates several signals: (1) a CPU Wait signal is generated if a CPU memory request is delayed by a competing memory access request; (2) a MODE signal indicates whether a CPU access or non-CPU access is being performed; and (3) a select signal is sent to the multiplexer 62 to select one of the three sources of address signals.

If the MODE signal indicates that a non-CPU access is being performed, then the address signals (and clock signals and so forth) are passed through to all four columns of memory chips 27A–27D, because all the memory chips Cxx are accessed simultaneously during refresh and video access cycles.

If the MODE signal indicates that a CPU access is being performed, then only one column of the memory 26 is accessed at a time, the selection being made in accordance with the two low order bits A1,A0 of the address signal. That is, in CPU access mode, each address decoder 71–74 allows the address signal and other control signals to pass through to its corresponding memory column only if the value of the A1,A0 portion of the address signal corresponds to its set of memory locations (i.e., corresponds to the decoder's column of memory chips).

The expanded view of the video buffers 41–44 shows that these buffers each include a latch 81 for receiving data from the memory array 26, a shift register 82 for sequentially transmitting the video data, and a signal generator 83 for converting the binary video data from the memory 26 into an analog video signal useable by the display stations. The signal generator 83 is also generates horizontal and vertical synchronization signal waveforms in response to control signals (V-sync and H-sync) from the video controller 34.

The video buffers' method of operation corresponds to the memory organization scheme discussed above with reference to FIG. 2A, wherein the video data for each display is stored in an interleaved pattern, with the data for each display being stored in four-byte "packets". Each time video data is read from the memory 26 into a video buffer, the output data from all four columns of memory chips 27A-27D is latched into the latch 81 of one of the buffers. Thus 32 bits (8 from each column) are read into the buffer simultaneously. For each such data transfer, the video buffer used is determined by the video controller 34, which generates a separate load signal Ld Dx for each video buffer, in accordance with the address of the data read. Furthermore, as video data is sequentially read from the memory 26 the data is directed, in sequential fashion, to the video buffers for each of the displays.

As is standard in all such bit mapped video systems, the transfer of data from the latch 81 in each buffer to the shift register 82 is coordinated with the system's "pixel clock" P.Clk. In other words, as the last bit of video data in each of the shift registers 82 is sent to the displays D0-D3, the next set of video data is transferred from the latches 81 into the shift registers 82. This transfer is controlled by the Tx signal generated by the video controller 34.

Referring back to FIG. 3, the overall operation of the memory system 24 is as follows. The CPU 22, refresh controller 32 and video controller 34 act as independent units. The multiplexer logic subassembly 36 arbitrates memory access requests from these three sources in accordance with a predetermined priority scheme, as described above.

A CPU address translator 38 permits the CPU 22 to access both the general purpose and video data portions of the memory 26 without regard to the physical organization of the memory array's address locations. In particular, the CPU uses a preselected contiguous set of address values to address the video data for each display and the CPU address translator generates the corresponding physical memory address signals. Thus, the data storage pattern for video data is transparent to the CPU 22.

Independent of everything else, the refresh controller 32 exercises the memory array 26 to ensure the integrity of the data therein.

The video controller 34 controls the flow of data from the memory array 26 to the display stations D0-D3. It periodically addresses the memory array 26 to load in a new set of values into the memory chips' internal shift registers. When it does so, all four columns 27A-27D of the memory array 26 are accessed simultaneously. Also, each time the internal memory shift registers are clocked by the video controller 34 all four columns 27A-27D of the memory array are accessed simultaneously.

The simultaneous access of 32 bits of video data during each video memory cycle (as opposed to accessing only 8 bits at a time) reduces the required speed of the memory chips Cxx and also reduces the timing constraints on the memory system 24. Furthermore, the use of dual ported memory chips Cxx with internal shift registers (such as the TMS 4161 chips used in the preferred embodiment) also reduces the timing constraints on the memory system 24 because this reduces the frequency with which the video controller 34 needs to address the memory 26.

The video data flowing from the memory array 26 to the displays D0-D3 is buffered by video buffers 40-43. Each video buffer receives 32 bits of data at a time from the memory array 26 and then serially transmits this data to its corresponding display station via a video signal generator 83. The video signal generator 83, which is of standard design, translates binary data signals into monochrome video signals and also generates, in response to control signals from the video controller 34, the vertical and horizontal synchronization and blanking signals needed by the display.

Figure 6:
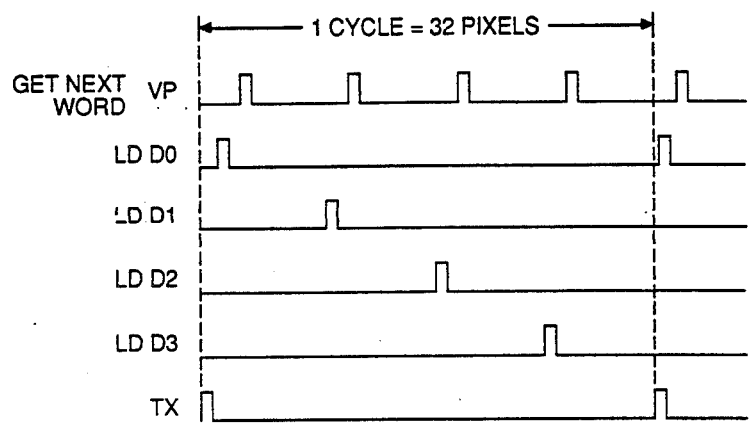
FIG. 6 is a timing diagram for the loading of video data into the system's video buffers.

Referring to FIG. 6, there is shown a timing diagram for the loading of video data into the system's video buffers. The four load signals Ld D0 to Ld D3 represent the signals generated by the video controller 34 which are used to determine when the data on the video port bus (VP BUS) is loaded into the latch 81 of the corresponding video buffer (e.g., Ld D0 is used for loading data into the latch 81 in video buffer 40 for display D0).

After the data currently on the VP BUS is loaded into the corresponding video buffer, the video controller generates a Get Next VP Word signal, which causes the next word of video data in the memory 26 to be transferred to the VP BUS. Since, as discussed above, the memory chips in the memory array 26 have an internal 256 bit shift register, the video controller normally needs to only generate a Shift signal in order to put the next word of video data onto the VP BUS. But once every 256 cycles, these internal shift registers must be reloaded.

Therefore the Get Next VP Word signal shown in FIG. 6 is a composite signal which represents a composite of the Shift signal and the control signal generated by the video controller 34 when a new video address is used to load the internal 256 shift registers in the memory chips Cxx. Referring to FIG. 5, this control signal is represented by the "video" input signal to the priority logic circuit 64, and the video address generated by the video controller 34 is represented by the "video" input signal to the multiplexer 62.

In the preferred embodiment, the video controller 34 paces the loading of data into the video buffers 40-43 at a steady rate. However, since this data loading operation typically takes only a small fraction of the time available during each 32 pixel display period, in alternate embodiments the data loading could be concentrated in or moved to any portion of the available time slot.

As will be understood by those skilled in the art, in another alternate embodiment, the latch 81 in the video buffers 40-43 could be eliminated by using the Ld D0-Ld D3 signals to load data directly from the VP BUS into the appropriate shift register 82 as the last bit of data in that shift register 82 is sent to the corresponding display. In such an alternate embodiment, the horizontal and vertical control signals for the four displays will need to be staggered because the flow of data to each of the displays will be 8 bits out of phase with the displays whose data is read sequentially before and after it.

Figure 7:
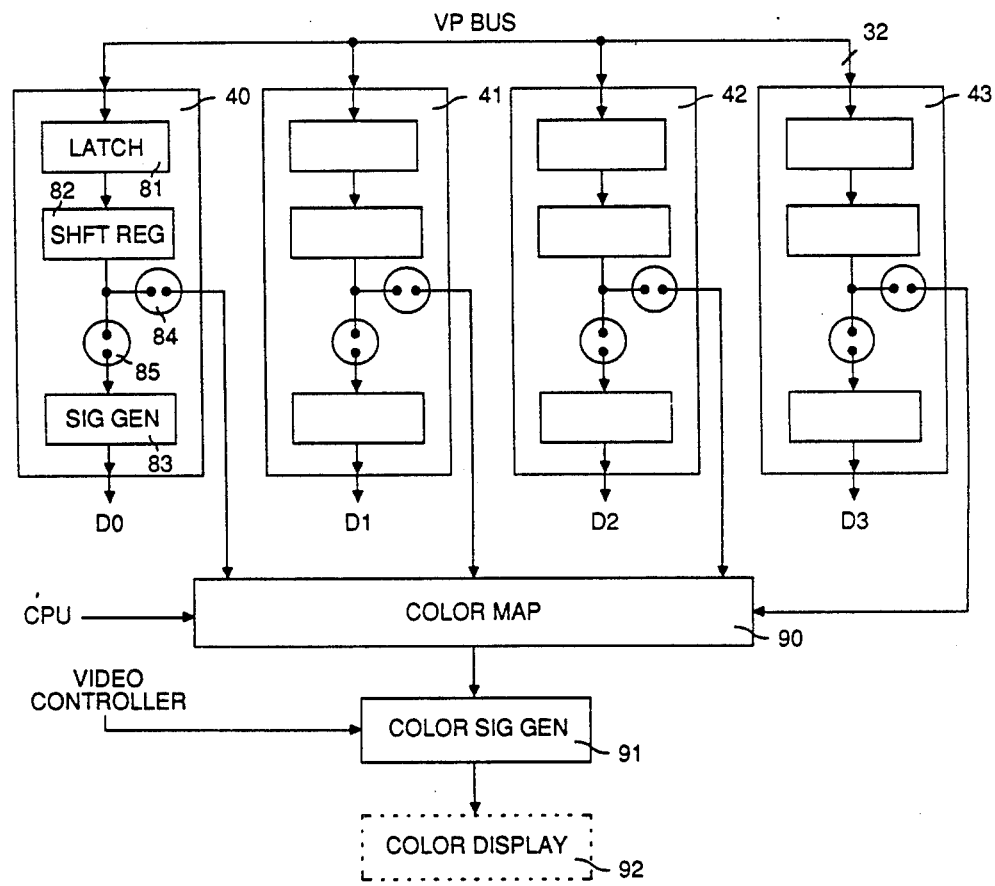
FIG. 7 is a partial block diagram of an embodiment of the invention which can be used either for multiple monochrome display stations, or for a smaller number of color display stations.

Referring to FIG. 7, while a video buffer having only single shift register could be used, the use of a double buffer permits the conversion of the system for use as a color display memory system. In this embodiment of the invention, either monochrome video data for four displays or color video data for one display can be stored in the memory 26. This aspect of the present invention can produce significant cost savings by eliminating the need for two separate color and monochrome system designs and also eliminating the corresponding duplication in inventory and quality control expenses.

When color video data is stored in the memory 26, the four sets of data are used simultaneously to provide a four-bit color code for each pixel of the display. Hence the need for both a latch 81 and shift register 82 in each video buffers 40–43.

As is standard in the prior art, a color map 90, which is generally a small, high speed, random-access memory, translates the four bit color code for each pixel into an appropriate set of control signals for a standard color video signal generator 91. The output of the color video signal generator 91 goes to a color video display device 92.

The color generated on the display 92 for each four-bit color code value is controlled by the contents of the color map 90. In the preferred embodiment, the values stored in the color map 90 are loaded into the color map by the CPU 22. Therefore, different color combinations can be defined and used for different images.

There are several different ways the memory system 24 could be set up to distinguish when it is to operate as the memory for four monochrome displays from when it is to operate as the memory for one color display. In one embodiment, the printed circuit board on which the system 24 is built includes connectors (e.g. jumpers) 84 and 85 in each video buffer 40–43. If connectors 84 are opened and connectors 85 are closed, then the device operates in monochrome mode because only the data path through connector 85 to the monochrome signal generators 83 is operative. Similarly, if connectors 85 are opened and connectors 84 are closed, then the device operates in color mode. In an alternate embodiment, a binary Color/Monochrome signal, supplied either by downloading a value from the CPU 22 or by a separate DIP switch included in the system 24 for this purpose, is used to enable/disable the operation of the color/monochrome video signal generators.

As can be now be seen, the video data which is associated with each video buffer comprises a distinct set of video data. In monochrome mode each distinct set of video data is a separate image, whereas in color mode each distinct set of video data is one bit of the multi-bit color code for an image. In either case the CPU 22 accesses each distinct set of video data in the memory 26 using a distinct set of contiguous address values.

In alternate embodiments of the invention, a number of the basic parameters, such as the number of bits per pixel and the number of displays serviced by the memory system 24 could be modified. For instance, two bits per pixel could be used in monochrome mode by replacing the shift register 82 in each video buffer with two parallel shift registers and a digital-to-analog converter for converting the two-bit pixel patterns into a gray scale analog signal. In another variation, the number of monochrome displays being handled could be increased to eight or more, with one color channel being provided for each set of four monochrome channels. Yet another variation would be to change the ratio of monochrome channels to color channels so as to increase the number of bits per pixel used in color mode.

Figure 8:
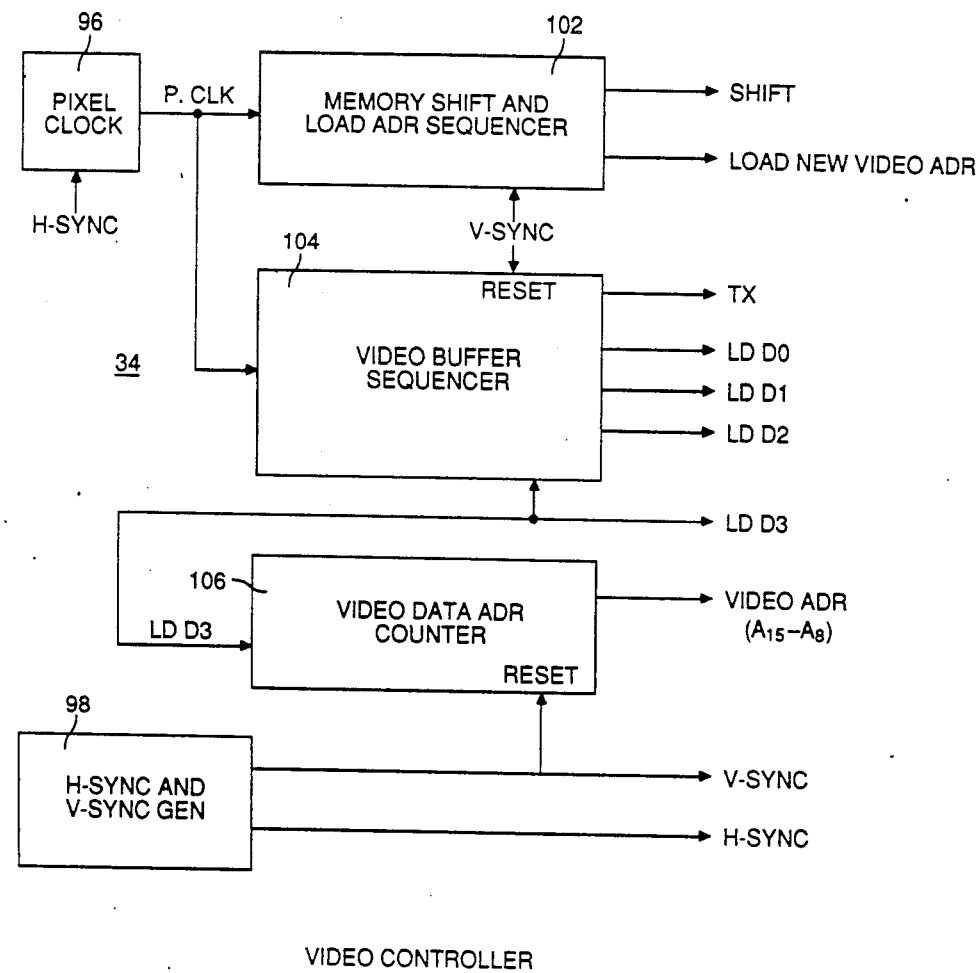
FIG. 8 is a block diagram of a video controller in accordance with the preferred embodiment of the invention.

Referring to FIG. 8, there is shown a block diagram of the preferred embodiment of the video controller 34. The operation of the video controller 34 will be explained with reference to both FIG. 8 and FIG. 5.

The video controller 34 has two basic clocks from which it generates the other timing signals needed by the memory system 24; a pixel clock 96 and a display synchronization clock 98.

The pixel clock 96 generates a P.Clk signal which oscillates at the rate which pixels are displayed on the screens of the displays D0–D3. Thus, the P.Clk signal is the signal used to control the shift rate of the shift registers 82 in the video buffers 40–43. Once each pixel clock cycle, one pixel of information is transferred from each shift register 82 to the corresponding video signal generator 83 (or color map 90 when the system 20 is in color mode) which converts the pixel into an analog video signal for use by the corresponding display.

The Shift and Load New Video Adr signals for controlling the memory chips' internal shift registers are generated by a sequencer circuit 102. The Shift signal causes these internal shift registers to shift; the Load New Video Adr signal (corresponding to the video input signal to the Priority Logic circuit 64 in FIG. 5) causes a new set of video data to be loaded into the internal shift registers using the address generated by the video data address generator 106 (discussed below). This sequencer 102 divides down the pixel clock P.Clk by a factor of 32 to generate the Shift Clock, and by an additional factor of 256 to generate the Load New Video Adr signal.

The video data transfer control signals Tx, and Ld D0–Ld D3 are generated by a video buffer sequencer 104. As described above, the Ld Dx signals control when data is loaded from the VP Bus to the latches 81 in the video buffers. The Tx signal controls when data is transferred from the latches 81 to the shift registers 82. These signals are generated using standard counter circuits which divide down the pixel clock signal into appropriate intervals, such as those shown in the timing diagram in FIG. 6.

The address Video Adr (corresponding to the video input signal to the multiplexer circuit 62 in FIG. 5) of the video data to be loaded into the internal shift registers of the memory chips Cxx is generated by a Video Data Address Counter 106, which simply starts at a preselected address at the beginning of each video display sequence and then increments (in response to the Ld D3 signal) each time a new set of video data is needed.

The vertical and horizontal clock signals V-sync and H-sync are generated by a clock generator 98. These signals are used not only by the video signal generators 83 and 91 to control the display stations, but are also used by the Video Data Address Counter 106 to synchronize the flow of data from the memory 26 to the display stations with the raster scans of the display stations.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A memory system for use in a data processing system having data processing means and a plurality of display stations comprising:
    a memory array for storing a separate screen of bit mapped video data for each of said plurality of display stations, wherein said video data for each of said plurality of display stations is stored in a noncontinuous set of locations in said memory array in accordance with a first memory access pattern;
    a video data buffer for each said display station;
    video signal generator means for each said display station for translating a stream of binary video data values into a corresponding video signal useable to generate an image on a corresponding one of said display stations;
    a single video refresh controller means for refreshing all of said display stationw with said separate corresponding screens of video data, including means for accessing the video data for all of said display stations using a continuous sequential memory access pattern distinct from said first memory access pattern, for temporarily storing said video data in the corresponding video data buffers, and for serially transmitting said video data to the corresponding video signal generating means; and
    data processor address translation means for translating address signals generated by said data processing means into physical address signals for accessing said video data in said memory means in accordance with said first memory access pattern, so that said data processing means can use a preselected continuous set of address values to access the video data for each said display station without regard to said first memory access pattern;
    whereby a single memory array and a single video controller can be used to service a plurality of display stations displaying distinct images.

2. A memory system as set forth in claim 1, wherein a first predefined portion of said memory array is used for general data processing purposes by said data processing means and a second predefined portion of said memory array is used for storing said video data;
    said address translation means including;
        mode detection means for determining whether the address signals generated by said data processing means correspond to said first or to said second predefined portions of said memory array; and
        address logic means for translating said preselected continuous set of address values used by said data processing means for accessing the video data for each said display station into memory address signals in accordance said first memory access pattern.

3. A memory system as set forth in claim 1, further including:
    color video generating means for receiving a stream of multi-bit values and for generating a corresponding color video signal for use with a color video display device; and
    means for simultaneously transmitting said video data from a plurality of said video data buffers to said color video generating means.

4. A memory system as set forth in claim 1, further including;
    color video generating means for receiving a stream of multi-bit values and for generating a corresponding color video signal for use with a color video display device; and
    means for determining whether said memory system is in color mode or monochrome mode;
    wherein
    said video controller means includes means for transmitting said video data to said color video generating means when said memory system is in color mode, and for transmitting said video data to said plurality of display stations when said memory system in monochrome mode.

5. A memory system as set forth in claim 4, wherein said video data buffers each includes both a latch for temporarily storing the video data for the corresponding display station and a shift register for serially transmitting said video data, said latch and shift register being responsive to signals generated by said video controller means;
    whereby the data for each said display station can be first stored in a corresponding latch, transferred to said shift register, and then transmitted from said shift register simultaneously with the transmission of data from said other video data buffers.

6. A memory system for use in a data processing system having data processing means and a plurality of monochrome signal generators and monochrome display stations said memory system also being useable in a data processing system having at least one color signal generator and color display station, said memory system comprising:
    a memory array including sufficient storage capability for storing a separate screen of bit mapped video data for each of a plurality of monochrome display stations, wherein a plurality of distinct sets of video data are stored in said memory array, each in a noncontinuous set of locations in said memory array in accordance with a first memory access pattern;
    a plurality of video data buffers, including one for each said distinct set of video data;
    mode means for determining whether said memory system is in color mode or monochrome mode;
    a single video refresh controller means for generating control signals for
        (a) reading video data from said memory array using a continuous sequential memory access pattern distinct from said first memory access pattern, and temporarily storing said video data from each said distinct set of video data in the corresponding one of said video data buffers; and
        (b) serially transmitting said video data from said video data buffers to the corresponding monochrome video signal generators when said memory system is in monochrome mode, and for transmitting said video data to said color video generator when said memory system is in color mode; and
    data processor address translation means for translating address signals generated by said data processing means into physical address signals for accessing said video data in said memory means in accordance with said first memory access pattern, so that said data processing means can use a preselected continuous set of address values to access the video data for each said set of display data without regard to said first memory access pattern.

7. A memory system as set forth in claim 6, wherein a first predefined portion of said memory array is used for general data processing purposes by said data processing means and a second predefined portion of said memory array is used for storing said video data.

* * * * *